Oct. 7, 1947.                H. ZIEBOLZ                2,428,747
                         ELECTRONIC REGULATOR
              Filed Dec. 30, 1941           2 Sheets-Sheet 1

Inventor
H. Ziebolz
By A. D. Adams
Attorney

Oct. 7, 1947. H. ZIEBOLZ 2,428,747
ELECTRONIC REGULATOR
Filed Dec. 30, 1941 2 Sheets-Sheet 2

Inventor
H. Ziebolz
By A. D. Adams
Attorney

Patented Oct. 7, 1947

2,428,747

UNITED STATES PATENT OFFICE 2,428,747

ELECTRONIC REGULATOR

Herbert Ziebolz, Chicago, Ill., assignor, by mesne assignments, to Electronbeam, Ltd., Chicago, Ill., a partnership of Illinois Application December 30, 1941, Serial No. 424,985

13 Claims. (Cl. 236—78)

This invention relates to regulator systems employing electronic devices. In particular, the invention is concerned with regulator systems employing electronic translating devices of the types disclosed in my prior applications, Ser. No. 417,871, filed November 4, 1941; Serial No. 421,992, filed December 6, 1941; and Serial No. 424,059, filed December 22, 1941.

An object of the invention is to devise a regulating system employing a cathode-ray tube type of translating device in which the electron beam of the tube is deflected in response to variations in a condition which is to be regulated or controlled, and deflection of the beam controls the release of energy in an output circuit which, in turn, exercises a regulating action on the condition to maintain the condition substantially constant.

Another object is to provide means for preventing "hunting" of the regulator system.

A further object is to devise a regulating system responsive to one condition for regulating another condition to maintain a predetermined ratio between the two conditions. The invention also involves means for varying the ratio to be maintained between conditions.

Other aims and advantages of the invention will appear from the following specification, when considered in connection with the accompanying drawings, wherein.

Figure 1:
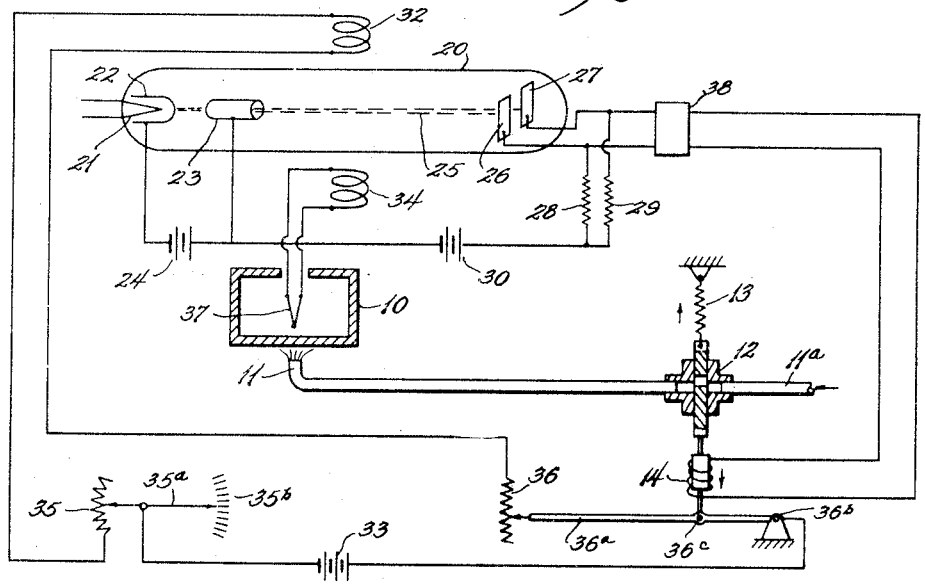
Fig. 1 is a circuit diagram showing one embodiment of a regulator system according to my invention for maintaining a substantially constant temperature in a furnace, oven or other device heated from a controlled source of heat.

Referring to Fig. 1 of the drawing, 10 indicates an oven or other device which is to be maintained at a constant temperature and which is heated by suitable heating means represented by the burner 11 which is supplied with fuel through a supply pipe 11a. A control valve 12 is included in the pipe 11a for controlling the amount of fuel supplied to the burner 11. This valve may be of any well known construction. In the arrangement illustrated in Fig. 1, the valve is normally biased to closed position by a suitable biasing means represented by the spring 13 and is moved towards open position by suitable means represented by the electromagnet 14.

Magnet 14 is variably energized from the output circuit of an electronic translating device employing a cathode-ray tube. The electronic translating device shown in Fig. 1 corresponds to the translating device shown in Fig. 1 of my prior application Ser. No. 417,871, filed November 4, 1941, now Patent No. 2,314,302. The internal construction of the cathode-ray tube may be of any suitable and well known type, but for the purpose of illustration, the tube has a source of electrons represented by a heater or filament 21 for heating an electron emitting cathode 22. The electrons emitted by cathode 22 are accelerated and focused into an electron beam of suitable shape directed along the axis of the tube by means of an accelerating and concentrating electrode 23 mounted in the tube and maintained at positive potential with respect to the cathode 22 by means of a suitable source of potential represented by the battery 24. The electron beam established within the tube is indicated by dotted lines 25.

Suitable electron receiving means, represented by the anode plates 26 and 27, are positioned within the tube to receive electrons from the beam 25. While two anode plates have been shown, it will be understood that only one plate may be employed if desired. The anodes 26 and 27 are connected through suitable coupling resistances 28 and 29 to a source of positive potential, represented by the battery 30, the negative terminal of which is connected to the positive terminal of battery 24. In some instances, the battery 30 may be omitted. Moreover, it is not essential that resistances 28 and 29 be connected to the battery 24, but they may be connected to ground. The load circuit connected to plates 26 and 27 supplies current to magnet 14. An amplifier 38 may be included if desired.

The electron beam 25 may be initially concentrated or focused on either plate 26 or 27 or it may be focused to impinge upon both plates to an equal extent. In this example, the beam is deflected relative to both plates by means of a magnetic deflecting coil 32 which establishes a magnetic field transversely of the beam 25, whereby the beam is deflected in a direction depending upon the direction of the field established by the coil 32.

The primary deflecting coil 32 is energized from a suitable source of current of constant voltage represented by the battery 33. A variable resistance or rheostat 36 is included in the circuit to coil 32 for adjusting the normal current supplied to coil 32 and thereby adjusting the temperature to be maintained in oven 10. A suitable index arm 35a may be provided on rheostat 35 to cooperate with a temperature scale 35b for indicating the temperature to be maintained. A variable resistance 36 is also included in the circuit to coil 32 and is arranged to be operated by movements of the supply valve 12. As shown, the variable contact to rheostat 36 is mounted upon an arm 36a which is pivoted at one end 36b and is connected at the point 36c with the armature of electromagnet 14 which operates valve 12. The purpose of this arrangement will be explained hereinafter.

Secondary deflecting coil 34 is energized from a suitable temperature responsive device represented by the thermocouple 37 which is positioned to respond to the temperature of the oven.

Operation of the arrangement shown in Fig. 1 is as follows:

Normally, with no deflecting action from coils 32 and 34, the beam 25 will be directed between the anodes 26 and 27 and no energy will be developed in the output circuit of the relay. Assuming that temperature control 35 has been set for a temperature above the temperature existing in oven 10, primary coil 32 will deflect beam 25 in a direction to establish current (or to increase the current) in the output circuit of the relay and operate magnet 14 to open the fuel control valve 12. This admits more fuel to burner 11 and the temperature of the oven begins to rise. Since the temperature of the oven does not respond immediately to the increase in heat supply, resistance 36 is included in the circuit of coil 32, and the opening of valve 12 serves to increase the value of this resistance and thereby lowers the temperature demand called for by temperature control 35. Thermocouple 37 responds to the temperature of the oven and energizes secondary deflecting coil 34 in a direction tending to deflect the beam in the opposite direction from the deflection produced by coil 32. As the temperature of the oven rises, coil 34 causes the beam 25 to move back towards its central position, and this reduces the amount of current supplied to magnet 14 and allows the control valve 12 to move towards closed position in response to increase in temperature of the oven 10. As the valve 12 closes, the resistance included in the circuit of coil 32 at rheostat 36 is automatically decreased so that the final temperature which is established in oven 10 will be the temperature determined by the setting of control 35. The inclusion of the rheostat 36 in the circuit of coil 32 prevents overshooting or "hunting" of the regulator system.

If the temperature of oven 10 should rise above the temperature set by the control 35, or if the control 35 should be set to maintain the temperature below the existing temperature of oven 10, then the deflecting effect of coil 34 will cause the beam 25 to move towards its normal position and will decrease the current supplied to magnet 14 and thereby allow control valve 12 to move towards its closed position and reduce the supply of fuel to the burner.

Figure 2:
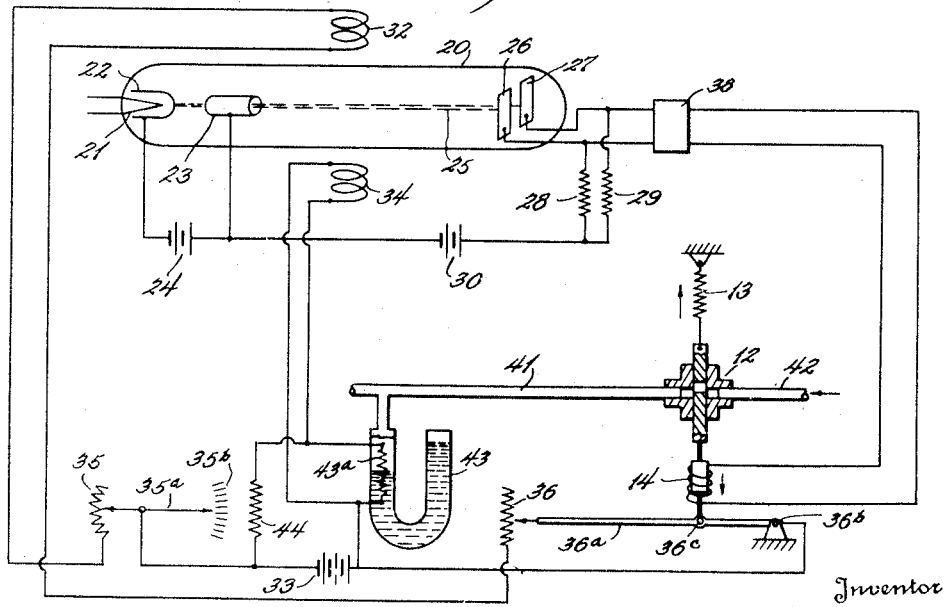
Fig. 2 is a schematic diagram showing a regulator system applied to a pressure control problem.

The regulator system shown in Fig. 2 is designed for controlling the pressure condition in a duct or passage 41, or any other device supplied with fluid under pressure from a supply pipe 42. In Fig. 2, elements which perform the same functions as corresponding elements in Fig. 1 are indicated by like reference numerals.

The valve 12 controls the amount of fluid admitted to the conduit 41 from supply pipe 42 and is normally urged toward closed position by a spring 13.

A pressure responsive device represented by the mercury filled U-tube 43 is connected to a conduit 41 and is responsive to the pressure therein. A resistance element 43a is mounted in the arm of tube 43 which is subject to the pressure from conduit 41 and the mercury in this arm serves to short-circuit a variable portion of this resistance depending upon the elevation of the mercury column surrounding the resistance.

Secondary deflecting coil 34 is supplied with current from source 33 through a relatively high resistance 44, and the pressure responsive resistance 43a is connected in shunt to the coil 34 to vary the amount of current flowing in coil 34. It will be obvious that coil 34 may be energized from a separate source of energy, and resistance 43a may be connected in any desired manner to secure proper variation in current in coil 34. A variable resistance 35 controls the normal current flow through primary deflecting coil 32 and thereby sets the pressure to be maintained in conduit 41, the pressure being indicated on the scale 35b by indicator 35a.

Operation of the arrangement shown in Fig. 2 is as follows:

It will be assumed that the system is operating so that fluid under pressure is being supplied from supply pipe 42 to conduit 41 and it is desired to raise the pressure existing in conduit 41. Pressure control 35 is manually set at the desired pressure, and this change in 35 will increase the current flowing in coil 32 and thereby increase the deflection in tube 20 which increases the current supplied to magnet 41 and moves valve 20 to increase the fluid supplied to conduit 41. As the pressure in conduit 41 increases, the mercury column surrounding resistance 33 will be depressed and the resistance in shunt to deflecting coil 34 will be increased, thus allowing more current to flow through this coil and tending to counterbalance the deflection of the beam 25 by the coil 32. The action of coil 34 tends to decrease the output of the relay and thereby tends to close valve 12. Ultimately, the valve 12 will assume a position to maintain the pressure in conduit 41 called for by the setting of pressure control 35.

As in Fig. 1, rheostat 36, controlled by the movement of valve 12, is included in the circuit of coil 32 to prevent overshooting or "hunting" of the regulator system, although this control feature may not be required in all cases, especially where there is no substantial lag in operation of the regulator in response to changes in fluid pressure.

In case the pressure in conduit 41 should drop below the pressure called for by control 35, the mercury column surrounding resistance 43a will rise and thereby shunt more current away from coil 34, thus allowing coil 32 to deflect the beam to a greater extent and produce a greater current output from the relay to increase the opening of valve 12. In case the pressure in conduit 41 should rise above that called for by control 35, the mercury column surrounding resistance 43a will be lowered, thereby causing more current to flow through deflecting coil 34 which will result in shifting of the beam 25 further toward its normal position. This results in decrease in the current output of the relay and a consequent moving of the valve 12 toward its closed position to decrease the pressure in conduit 41.

Figure 3:
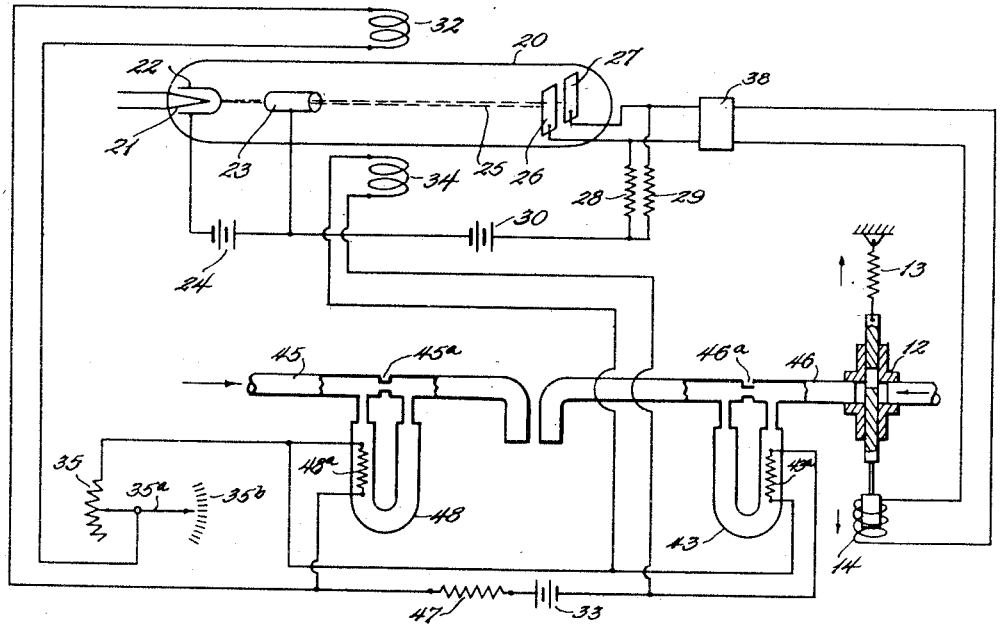
Fig. 3 is a schematic diagram showing a regulator system applied to a ratio control problem.

In Fig. 3, the system is shown as being employed to control the proportion or ratio between two conditions. It is applied for convenience to the control of the ratio between the rates of flow of two fluids such, for example, as fuel and air used in a furnace. The idea is to control the flow of one of the fluids in response to changes in flow of the other and always maintain a definite ratio.

In Fig. 3, elements having the same functions as corresponding elements in Figs. 1 and 2 are indicated by the same reference numerals. In the example shown, a fluid under pressure is supplied from a suitable source through conduit 45 for delivery to a consuming device, not shown. Fluid from another source is supplied under pressure through a conduit 46 for delivery to the consuming device. The flow in conduit 45 may vary from time to time, and it is desired to maintain a definite ratio between the fluid flow in the two conduits 45 and 46. Also, the pressure of the source of fluid supply to conduit 46 may vary from time to time, and it is desired to compensate for these pressure variations and to maintain a substantially constant flow as required by the ratio which is to be maintained with respect to the flow in conduit 45.

The arrangement for maintaining a substantially constant flow in conduit 46 is substantially like that shown in Fig. 2, except that the U-tube 43 responds to the differential pressure existing on opposite sides of an orifice 46a in conduit 46 on the output side of control valve 12 and thereby responds to the rate of flow in conduit 46. Resistance 43a is connected in shunt to coil 34 as in Fig. 2. Current for energizing coils 32 and 34 is supplied from source 33, but the connection differs somewhat from Fig. 2 in that the two coils are connected in serial circuit relation with the source 33 and a resistance element 47 is included in the circuit. The rheostat 35 is also included in the circuit to coil 32 for adjustment of the ratio to be maintained. A flow responsive device represented by the U-tube 48 is arranged to respond to the difference in pressure existing on opposite sides of orifice 45a in conduit 45 and thus responds to the rate of flow in this conduit. A resistance element 48a is positioned in one arm of the tube 48 and a variable portion of this resistance is short-circuited by the mercury in the tube depending upon the rate of flow in conduit 45. Resistance 48a is connected to provide a variable shunt path around deflecting coil 32, the rheostat 35 being included in the connections between resistance 48a and coil 32.

In the operation of the arrangement shown in Fig. 3, so long as there is a constant rate of flow of fluid through conduit 45, the resistance 48a remains at at fixed value. The flow responsive device 43 will respond to any variations in flow in conduit 46 which may be due to any variations in pressure of the source of fluid supplied, and this device acts on the cathode-ray relay in a manner to compensate for the variation in rate of flow and to maintain a substantially constant rate. The manner of operation of the system for maintaining a constant flow in conduit 46 is believed to be clear from the foregoing description of operation of Fig. 2.

If the rate of flow in conduit 45 should change, the mercury column in U-tube 48 will vary the amount of resistance 48a and thereby cause a variation in current supplied to deflecting coil 32. This results in a change in the standard of operation of the regulator circuit and will call for a change in the rate of fluid supplied by conduit 46. The arrangement is such that if the rate of flow increases in the conduit 45, the rate of flow in conduit 46 will be correspondingly increased to maintain a definite ratio between the rates of flow in these two conduits. It will be noted that the regulator system will continue to maintain a constant rate of flow in conduit 46, even though the absolute value or rate of flow has been modified by the device 48. In other words, the rate of flow in conduit 46 is always maintained substantially constant, but the value of the rate of flow is controlled by the device 48 to maintain a predetermined ratio between the rates of flow in the two conduits.

In Fig. 3, variable resistance 43a exercises a control on deflecting coil 32 as well as coil 34. For example, as the resistance 43a increases in value, the current in coil 34 increases, while the current in coil 32 decreases, and vice versa. In the same manner, variable resistance 48a exercises a control over coil 34 as well as coil 32. An increase in resistance in 48a causes an increase in current in coil 32 and a decrease in coil 34, and vice versa.

By adjusting the value of rheostat 35, the degree of control exercised by the device 48 on deflecting coil 32 is modified and this modifies or changes the ratio which is maintained between the rates of flow in the two conduits. By increasing the resistance of 35, a smaller amount of fluid will be supplied through conduit 46 for a given rate of flow through conduit 45 and vice versa.

Figure 4:
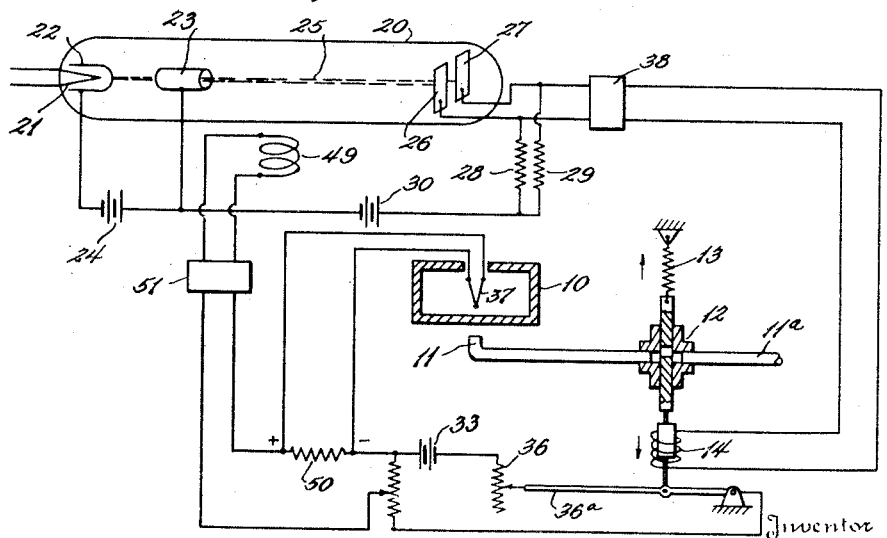
Fig. 4 is a schematic diagram illustrating a modified regulator system applied to a temperature control problem.

In Fig. 4 the regulator system is shown as being applied to a temperature control problem and employs the null method of controlling the electronic relay. This system is otherwise similar to that disclosed in Fig. 1. It will be understood, however, that this type of regulator may be used to control any other condition. In this example, the electronic relay and control circuits therefore correspond to the arrangement disclosed in my copending application, Ser. No. 424,059, filed December 22, 1941. Instead of employing two deflecting coils, only one deflecting coil is employed and this coil is supplied with a normal energizing current from source 33 through potentiometer 35a tending to deflect the beam 25 in a direction to open the valve 12. The potentiometer 35a is included in the circuit of coil 49 to adjust or fix the normal current supplied to coil 49 and thereby fix the temperature to be maintained in oven 10. The variable potential derived from thermocouple 37 is supplied to the energizing circuit of coil 49 in opposition to the current established in this circuit by the source 33, in the same manner as disclosed in the aforesaid copending application. The coupling resistance 50 may or may not be included as desired. Also, an amplifier 51 may be employed to amplify the resultant current or voltage supplied to coil 49 from sources 33 and 37.

In the operation of the arrangement shown in Fig. 4, the action of the source 33 through the coil 49 tending to deflect the beam is greatly in excess of that required to open the valve 12 to fully open position. As the temperature in oven 10 rises, the opposing voltage supplied from thermocouple 37 increases and thereby decreases the current supplied to coil 49, and this action continues until the temperature in the oven reaches a value called for by the temperature control 35. At this time, the opposing action of the thermocouple 37 is substantially equal to the action of the source 33 and only a very small current is supplied to coil 49 of sufficient value to maintain the required supply of heat to the burner 11. The anti-hunting resistance 36 is included in the circuit of potentiometer 35a and controls the energization of coil 49 to prevent hunting of the regulator. The action of this resistance is clear from the foregoing description of Fig. 1.

In Figs. 1 to 3, the arrangements are such that with no current flow in coil 34, the deflecting action of coil 32 is in excess of that required to fully open valve 12.

In all of the arrangements disclosed herein, the electron beam of the cathode-ray tube may be deflected by other means instead of deflecting coils, such as by deflecting plates or other devices.

In Figs. 1 to 3, the deflecting coil 32 and the circuit elements for variably energizing this coil from source 33 comprises means for adjustably setting the standard of operation of the regulator or for fixing the magnitude of the condition to be maintained constant. The anti-hunt resistance may be termed means for modifying the standard of operation of the magnitude setting means in response to variations in operation of the control valve 12. In Fig. 3, the flow responsive device 48 also serves to modify or change the setting of the magnitude setting means. In Fig. 4, the rheostat 35 which controls the normal current supplied to coil 49 constitutes the magnitude setting means, and the rheostat 36 serves to modify this setting means in accordance with the operation of the valve 12.

Obviously, the present invention is not restricted to the particular embodiments thereof herein shown and described.

What is claimed is:

1. A regulator system comprising, in combination, control means to vary the magnitude of a condition, an electronic relay having an output circuit and including a cathode-ray tube having beam deflecting means, means for energizing said control means from the output circuit of said relay, magnitude setting means comprising means for normally deflecting the electron beam of said relay in a direction to increase the magnitude of said condition, and means responsive to the magnitude of said condition and acting on said beam deflecting means for opposing the action of said magnitude setting means and thereby limiting the increase in said condition to a value determined by the setting of said magnitude setting means.

2. A regulator system according to claim 1, wherein said cathode-ray tube is provided with secondary deflecting means and said condition responsive means energizes said secondary deflecting means to deflect the electron beam in opposition to said magnitude setting means.

3. A regulator system according to claim 1 and including anti-hunting means responsive to the operation of said condition controlling means and exerting a control action on said relay tending to oppose the operation of said condition controlling means.

4. A regulator system comprising, in combination, control means to vary the magnitude of a condition, an electronic relay including a cathode-ray tube having a primary beam deflecting means; means for energizing said control means from the output circuit of said relay, magnitude setting means for normally energizing said primary deflecting means in a direction to increase the magnitude of said condition, means responsive to said condition for opposing the action of said primary deflecting means, and means responsive to the operation of said condition controlling means for modifying the action of said primary deflecting means on said relay.

5. A regulator system according to claim 4, wherein the means responsive to said condition is connected to reduce the energy supplied to said primary deflecting means by said magnitude setting means.

6. A regulator system according to claim 4, wherein the condition responsive means embodies means for developing in the energizing circuit of said primary deflecting means a variable potential tending to nullify the action of said magnitude setting means on said primary deflecting means.

7. A regulator system comprising, in combination, means connected to control a condition which is subject to variation, an electronic relay connected to operate said condition controlling means, adjustable control means for setting the relay, means responsive to said setting means and acting on said relay to set the magnitude of the regulated condition and tending to change said condition, means responsive to the magnitude of said condition for controlling said relay in opposition to said adjustable control means, and means responsive to a second condition which is subject to variation, said second condition responsive means being connected to modify the action of said magnitude setting means to maintain a predetermined ratio between the magnitude of said two conditions.

8. A regulator system comprising, in combination, an adjustable valve for controlling a condition to be regulated, an electronic relay of the cathode ray tube type for operating said valve, beam-deflecting means acting on said relay tending to move said valve to vary said condition, secondary control means acting on said relay in opposition to said beam deflecting means, said secondary control means being variably energized in accordance with the magnitude of said condition, and anti-hunting means controlled by the movement of said valve and operating to modify the action of said relay.

9. A regulator system comprising, in combination, an electronic relay of the cathode-ray type, means responsive to a primary condition for creating a deflecting force acting on the beam in one direction, means operated by said relay to control a secondary condition, means to create a counteracting force on the beam, and means to vary the counteracting force in response to changes in the magnitude of said secondary condition to maintain the ratio of the magnitudes of said conditions substantially constant.

10. A regulator system according to claim 9, wherein an adjustable setting device is connected to influence at least one of the condition responsive means, whereby any predetermined ratio may be maintained between the two conditions.

11. A regulator system for controlling the ratio between a primary and secondary condition and varying the magnitude of the secondary condition in response to changes in the primary condition comprising, in combination, control means for the secondary condition; an electronic relay of the cathode-ray type connected to operate said secondary condition control means; means responsive to the primary and secondary conditions acting on the relay in opposition to each other; and means to vary the effect of at least one of the conditions on the relay relative to the effect of the other condition to maintain a predetermined ratio between the two conditions.

12. That method of controlling a variable condition which is characterized by creating a deflectable electronic beam acting to produce varying potentials, applying said varying potentials to control the magnitude of the condition at a rate proportional to the amount of deflection of said beam; applying a predetermined deflecting force in one direction to the electronic beam tending to bend the beam to change the condition; and applying an opposing deflecting force on the beam in response to the magnitude of the condition.

13. That method of controlling a variable condition which is characterized by creating a deflectable electronic beam to produce a potential of varying magnitude; applying the varying potential to control the magnitude of the condition at a rate proportional to the magnitude of said potential; creating a predetermined deflecting force acting on the electronic beam to change the condition; and modifying the deflecting action of said predetermined force in response to the magnitude of the condition to maintain the condition substantially constant.

HERBERT ZIEBOLZ.

REFERENCES CITED

The following references are of record in the file of this patent:

UNITED STATES PATENTS

| Number | Name | Date |
| --- | --- | --- |
| 2,112,682 | Ryder | Mar. 29, 1938 |
| 1,651,236 | Thwing | Nov. 29, 1927 |
| 2,096,653 | Soller | Oct. 19, 1937 |
| 2,096,012 | Soller | Oct. 19, 1937 |